United States Patent Office 2,847,438
Patented Aug. 12, 1958

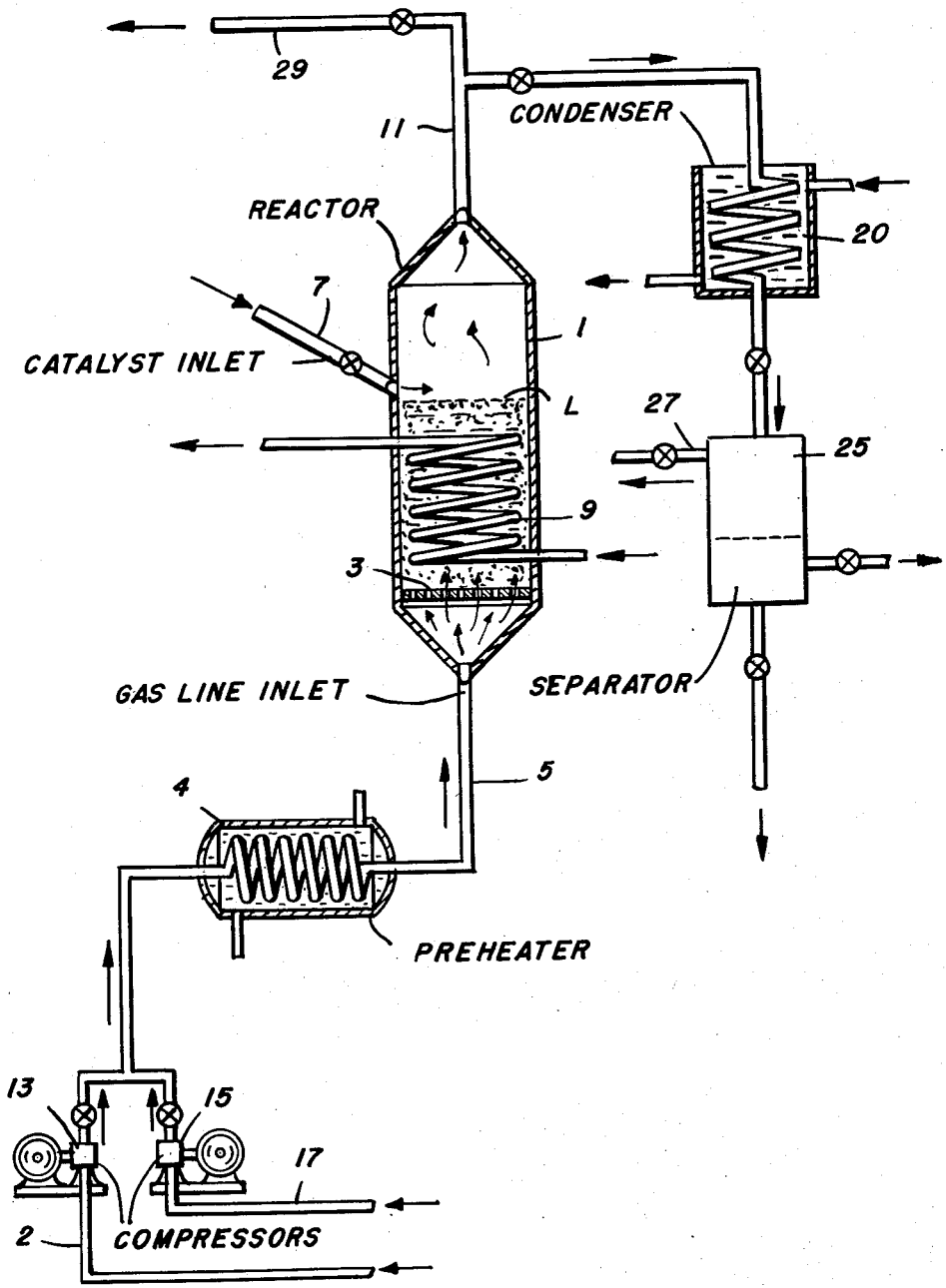

2,847,438

STARTING-UP PROCEDURE FOR THE SYNTHESIS OF HYDROCARBONS

Simpson D. Sumerford and James E. Moise, Baton Rouge, La., assignors to Esso Research and Engineering Company, a corporation of Delaware Original application November 12, 1948, Serial No. 59,462. Divided and this application June 3, 1952, Serial No. 291,414

3 Claims. (Cl. 260—449.6)

The present invention relates to the catalytic conversion of carbon oxides with hydrogen to form hydrocarbons and valuable oxygenated organic compounds. More particularly, the invention relates to an improved method of placing the conversion catalyst on stream to start the conversion process. The present application is a division of our co-pending application Serial Number 59,462, filed November 12, 1948, now abandoned.

The invention will be fully understood from the following detailed description and the accompanying drawing.

The synthesis of hydrocarbons and other valuable products from gas mixtures containing various proportions of hydrogen and carbon oxides, particularly carbon monoxide, in fixed bed, moving bed, as well as in dense phase fluid catalyst operation is well known in the art. The quality and character of the synthetic product depends largely on the temperatures, pressures, $H_2/CO$ ratios of the feed gas, and the type of catalyst used, the latter being usually an iron group metal catalyst promoted with such promoters as various alkali metal compounds, rare earth metal oxides, magnesia, alumina, and/or other compounds in amounts of about 0.5–10%.

For example, cobalt supported on an inert carrier and promoted with thoria and/or magnesia may be used in combination with relatively low pressures (atmospheric to about 5 atmospheres), low temperatures (about 375°–425° F.) and high $H_2/CO$ ratios of 2 or more, to produce a substantially saturated hydrocarbon material from which valuable diesel fuels, lubricating oils and waxes may be obtained. Iron-type catalysts usually promoted with a suitable alkali metal compound such as the chlorides or fluorides, carbonates, oxides, phosphates, nitrates, acetates, etc. of potassium or sodium may be used in combination with relatively high pressures (about 5–50 atmospheres), high temperatures (about 500°–750° F.) and low $H_2:CO$ ratios of not above 2, to produce a predominantly unsaturated material from which large proportions of high octane motor fuels may be recovered.

While the present invention is applicable to all types of synthesis operation outlined above, it is of greatest value when applied to the dense phase fluid type procedure using iron-type catalysts. This type of operation involves passing the synthesis gas upwardly through a dense turbulent mass of finely divided iron catalyst fluidized by the reacting gases and gasiform reaction products to resemble a boiling liquid having a well defined upper level.

Fresh synthesis metal catalysts are usually prepared by decomposing the corresponding metal carbonyls or by reducing the corresponding metal oxides with hydrogen at temperatures of about 500°–1600° F. and atmospheric or elevated pressures, specific conditions depending on the type of catalyst involved. All catalysts so prepared have an extremely high initial activity for the highly exothermic synthesis reaction. As a result serious difficulties have been encountered during the starting-up period of the process, particularly with respect to temperature control. For example, when a freshly prepared iron catalyst is contacted with fresh synthesis gas at synthesis conditions in a reactor equipped with heat withdrawal means normally sufficient to carry off the heat evolved by the synthesis reaction, the temperature may rise within a very short time of, say, one or two hours several hundred degrees above optimum reaction temperatures. Such high temperatures are conducive to an excessive formation of free carbon which is deposited on the catalyst and which detrimentally affects the active life and general utility of the catalyst for the synthesis reaction. While this is true to a certain extent for all types of synthesis operations, it has the most serious effects on the dense phase type fluid operation using iron catalysts.

Proper fluidization which determines failure or success of fluid operation depends largely on a proper particle size distribution throughout the dense catalyst phase. More particularly, the powdered catalyst must not contain a preponderance of particle fines having a size from 0–20 microns or the phase density will drop to a point at which all catalyst is eventually blown out of the reactor. All iron catalysts have a marked tendency to disintegrate under the heavy mechanical stresses of fluid operation. This tendency is considerably increased by the deposition of carbon on the catalyst. It will be appreciated, therefore, that if the reaction temperature and with it carbon formation are not carefully controlled during the early stages of the synthesis, catalyst disintegration may become so pronounced even during the starting period that inoperative conditions are encountered after on-stream periods of uneconomically short duration. The present invention overcomes this difficulty.

It is, therefore, the principal object of the present invention to provide means for controlling the temperature during the initial stages of the catalytic synthesis of hydrocarbons from carbon oxides and hydrogen.

A more specific object of the invention is to provide an improved starting-up procedure for a dense phase fluid catalyst type of hydrocarbon synthesis operation using iron-type catalysts.

Other objects and advantages will appear hereinafter.

In accordance with the present invention, freshly reduced synthesis catalyst is placed within the synthesis reactor in an atmosphere of hydrogen and heated under the desired operating pressure to a temperature at least closely approaching optimum synthesis temperature whereupon the hydrogen atmosphere is replaced if desired at once, but preferably steadily or in increments with the synthesis gas over a suitable period of time until the synthesis gas in the reactor is undiluted with extraneous hydrogen. Depending on the operating condition, the character of the catalyst, and the size and design of the reactor, the time elapsed from the start of synthesis gas feed until the reactor contains undiluted synthesis gas should be about 1–24 hours, longer periods being not harmful to the operation. The original hydrogen atmosphere acts as a diluent reducing the total heat release until equilibrium conditions between heat release and heat withdrawal have been reached. As a result, overheating during the starting period is avoided.

In accordance with the preferred embodiment of the invention the reactor is charged with unreduced catalyst, reduction of the catalyst is carried out in situ with hydrogen at suitable reduction conditions of temperature and pressure until the water formation ceases, temperature and pressure are then adjusted to those desirable for the synthesis process while continuing the hydrogen feed and, thereafter, the hydrogen feed is replaced steadily or in increments within a time of about 1–24 hours until undiluted synthesis gas is fed whereupon the process continues in a conventional manner. If desired, the temperature may be reduced, after catalyst reduction is completed, to a level slightly below that of synthesis operation whereby the initial heat release may be further buffered.

When carried out in this manner, the starting-up procedure of the invention permits perfect temperature control during the first critical hours of the synthesis process, particularly in dense phase fluid type operation using iron-type catalysts.

Having set forth its objects and general nature, the invention will be best understood from the following more detailed description in which reference will be made to the drawing which illustrates schematically one type of apparatus suitable for carrying out the invention.

Referring now in detail to the drawing, reference numeral 1 designates a conventional fluid type synthesis reactor provided with a gas distributing means such as grid 3, a gas feed line 5, a catalyst supply line 7, and a heat exchange means such as coil 9. When starting up the process, unreduced synthesis catalyst of fluidizable particle size is admitted to reactor 1 through line 7. Simultaneously an inert gas such as nitrogen is supplied from line 2 via preheater 4 and line 5. The inert gas may be preheated in heater 4 to any temperature sufficient to preheat the catalyst in reactor 1 to the desired reduction temperature of about 600°–1400° F. The heating effect of the inert gas may be aided by passing a suitable heating medium such as hot flue gases, steam, mixtures of diphenyl with diphenyl oxide, etc. through coil 9.

The superficial linear velocity of the inert gas entering reactor 1 through grid 3 is so adjusted that the catalyst in reactor 1 forms a dense turbulent mass of solids resembling a boiling liquid having a well defined upper level L. The gas leaves reacor 1 through line 11. The catalyst supply through line 7 may be discontinued when level L has reached a predetermined elevation. The conditions required for proper fluidization are well known in the art. For the purposes of this description it is sufficient to note that for most iron-type catalysts these conditions include particle sizes of 20–200 microns, mostly 50–100 microns, superficial gas velocities of about 0.3–2 ft. per second and apparent bed densities of about 50–150 lbs. per cu. ft.

When the catalyst has reached substantially the desired reduction temperature and all the air is replaced by nitrogen, hydrogen is supplied in place of nitrogen through line 2 and heater 4, and reactor 1 is placed under the pressure desired for catalyst reduction. This pressure is preferably atmospheric but may range up to about 400 lbs. per sq. in. The hydrogen feed rate is so controlled that proper fluidization velocities are maintained at a hydrogen space velocity of about 1000–2000 v./v./hr. Under these conditions reduction may be completed within about 4–10 hours, as determined by the absence of water in the gas leaving through line 11.

Thereafter the temperature in reactor 1 is decreased to the desired temperature for synthesis operation or about 10° to 150° F. below synthesis temperature, say to about 420° F., and the pressure is raised to a suitable synthesis pressure which lies for iron-type catalysts between about 150 and 600 lbs. per sq. in., preferably between 200 and 500 lbs. per sq. in. Now, the hydrogen supply through line 2 is replaced in steadily or periodically increasing proportions by synthesis gas containing $H_2$ and CO in the ratio of about 0.5–3:1 supplied by compressor 15 via line 17 and preheater 4 which is now so controlled to preheat the synthesis gas to about 300°–500° F. Simultaneously, a cooling medium such as steam, mixtures of diphenyl with diphenyl oxide, etc. is passed through coil 9 to absorb the heat released by the exothermic synthesis reaction now setting in. The feed rate of synthesis may be increased at the expense of free hydrogen feed in such a manner that full synthesis gas feed rate and an undiluted synthesis gas atmosphere in reactor 1 are obtained after about 5–20 hours of operation and the optimum synthesis temperature of, say, about 500°–650° F., is not substantially exceeded during this time until normal operating conditions are established. In the case of iron catalysts, for instance, synthesis gas may be first cut in at a rate of about 10% to 20% of the final operating rate and this rate may be increased by about 10% to 20% of the final rate every 1 to 2 hours.

Upon the start of the conversion reaction, synthesis products are withdrawn through line 11 and passed to a conventional product recovery system of which merely a condenser 20 and a liquid-gas separator 25 are shown. A portion of the total product in line 11 and/or of the gas separated in separator 25 may be recycled to reactor 1 via lines 29 and 27, respectively, in any manner known in the art. It will also be understood by those skilled in the art that a heating and cooling jacket may be provided around reactor 1 to take the place of coil 9 if the reactor diameter is too small to permit proper fluidization in the presence of a heat exchange coil. Other modifications obvious to the expert are within the scope of the invention.

The invention will be further illustrated by the following specific operating examples.

EXAMPLE I

A conventional fluid-type synthesis reactor was charged with an oxidized iron catalyst containing 78% iron, 20% copper, and 0.5% potassium and 1.5% impurities such as silicon and aluminum, calculated on an oxide basis, and having a particle size distribution as follows:

*Roller analysis*

| Microns: | Percent |
|---|---|
| 0–20 | 24.0 |
| 20–40 | 17.6 |
| 40–80 | 21.2 |
| 80+ | 37.2 |

The catalyst had a bulk density of 1.33 grams per cc. Reduction was carried out with $H_2$ in situ as described above for 4 hours at atmospheric pressure, a temperature of 673° F., a hydrogen feed rate of 1100 standard volumes of $H_2$ per volume of unfluidized catalyst per hour and a superficial linear gas velocity of 0.3 to 0.4 ft. per second. Thereafter the temperature was reduced to 475° F. and a synthesis gas having an $H_2$:CO ratio of 1 was cut in the hydrogen feed, at a feed rate of about 40 v./v./hr., and recycle (cold) was started at a ratio of about 10. Within the next 4 hours, the fresh synthesis gas feed rate was increased by about 110 v./v./hr. and the $H_2$ feed correspondingly decreased until a fresh undiluted synthesis gas feed rate of 480 v./v./hr. was reached, whereupon the process was continued in a normal manner. Temperature control during the starting-up period was satisfactory and no fluidization difficulties due to carbon formation were encountered.

EXAMPLE II

An iron material containing 92% Fe, 0.5% $NaCO_3$, and 7.5% impurities was used as the starting material. This material had a bulk density of 2.4 grams per cc. and a screen analysis as follows:

| | Percent |
|---|---|
| On 80 mesh | 13.0 |
| On 100 mesh | 4.5 |
| On 200 mesh | 34.2 |
| On 325 mesh | — |
| Through 325 mesh | 48.3 |
| | 100.0 |

The material was oxidized with a mixture of air and nitrogen to 16.6% $O_2$ in 21 hours at 1100°–1200° F. prior to charging to the synthesis reactor. Thereafter the material was charged to the reactor and treated therein as follows:

(1) Reduction with $H_2$ for 8 hours at 228 v./v.hr., 677° F. and atmospheric pressure.

(2) Circulation of $H_2$ during 27 hours leakage test at 550° F. and 300 p. s. i. g.

(3) Synthesis gas cut into the system filled with $H_2$ at 550° F. and 300 p. s. i. g. The synthesis gas had a 1.1:1 $H_2$/CO ratio and was free of $CO_2$. The feed velocity of the gas was 0.3 ft. per second, the feed rate 230 v./v./hr., and the ratio of recycle/fresh feed was 11, tail gas being used for recycle.

(4) The $H_2$ in the system was displaced from the reactor over a period of about 18 hours. Thereafter the process continued at the conditions so established. No fluidization difficulties were encountered during the starting-up period above described.

While the foregoing description and exemplary operations have served to illustrate specific embodiments of the invention, they are not intended to be limiting in scope. Other modifications may appear to those skilled in the art without departing from the spirit of the invention.

What is claimed is:

1. In the synthesis of hydrocarbons by contacting a bed of iron synthesis catalyst with a total feed gas consisting of a synthesis gas consisting of hydrogen and carbon monoxide in a mol ratio of not above 2.0:1 and recycled gas comprising a fraction of the products of the reaction at a superatmospheric synthesis pressure and an elevated reaction initiation temperature of above about 420° F. in a synthesis unit comprising a catalytic reaction zone and a liquid product recovery zone in which said recycled gas is separated from the product gases formed in the catalytic reaction zone, the method of starting up the unit which comprises pressuring the unit with a gas consisting of hydrogen to said superatmospheric synthesis pressure, circulating said gas consisting of hydrogen in said unit comprising said catalytic reaction zone and said liquid product recovery zone at said reaction initiation temperature and said superatmospheric synthesis pressure at a rate sufficient to maintain the catalyst in the fluidized state, then, while maintaining the unit at said superatmospheric synthesis pressure by controlling the introduction of hydrogen, introducing synthesis gas into the circulating hydrogen in advance of said catalytic reaction zone at an increasing rate controlled to maintain the temperature of the catalyst in the reaction zone below about 650° F. while recycling reactor effluent until the fresh feed to said unit consists of said synthesis gas, and continuing the introduction of synthesis gas into said unit in an on-stream period during which hydrocarbons are synthesized.

2. A method in accordance with claim 1 in which said reaction initiation temperature is within the range of about 420° F. to about 600° F.

3. A method in accordance with claim 2 in which said iron synthesis catalyst is at least partially reduced from the oxide.

References Cited in the file of this patent
UNITED STATES PATENTS

| | | |
|---|---|---|
| 2,244,196 | Herbert | June 3, 1941 |
| 2,437,051 | Sensel et al. | Mar. 2, 1948 |
| 2,445,795 | Millendorf | July 27, 1948 |
| 2,461,570 | Roberts | Feb. 15, 1949 |
| 2,483,512 | Voorhies, et al. | Oct. 4, 1949 |
| 2,527,846 | Phinney et al | Oct. 31, 1950 |
| 2,533,694 | Safford | Dec. 12, 1950 |
| 2,541,677 | Summerford et al. | Feb. 13, 1951 |
| 2,666,077 | McGrath | Jan. 12, 1954 |
| 2,691,033 | Easly et al. | Oct. 5, 1954 |